United States Patent [19]

Bennett

[11] Patent Number: 4,906,150
[45] Date of Patent: Mar. 6, 1990

[54] LOCKING FASTENER

[76] Inventor: Bruce A. Bennett, 15 Chestnut Ave., San Rafael, Calif. 94901

[21] Appl. No.: 164,825

[22] Filed: Mar. 7, 1988

Related U.S. Application Data

[63] Continuation-in-part of Ser. No. 888,011, Jul. 18, 1986, Pat. No. 4,734,001, which is a continuation-in-part of Ser. No. 755,907, Jul. 17, 1985, abandoned.

[51] Int. Cl.⁴ ............................................. F16B 39/10
[52] U.S. Cl. .................................... 411/119; 411/120; 411/985; 411/432
[58] Field of Search .............. 411/119, 120, 121, 122, 411/123, 124, 984, 985, 396, 429, 432, 348, 372, 372, 90, 91, 92, 93, 94, 95, 96, 97, 98, 99, 100, 396, 398

[56] References Cited

U.S. PATENT DOCUMENTS

| | | | |
|---|---|---|---|
| 113,427 | 4/1871 | Hargrove | 411/120 |
| 256,688 | 4/1882 | Holland | 411/119 |
| 388,764 | 8/1888 | Cooke | 411/120 |
| 516,563 | 3/1894 | Butler | 411/984 X |
| 1,229,783 | 6/1917 | Pogue | 411/120 |
| 2,385,777 | 10/1945 | Ebert | 411/985 |
| 2,404,520 | 7/1946 | Mosher | 411/984 X |
| 2,423,918 | 7/1947 | Wohlheiter | 411/985 X |
| 2,537,527 | 1/1951 | Heckert | 411/119 X |
| 2,561,224 | 7/1951 | Pischek et al. | 411/120 |
| 2,612,911 | 10/1952 | Usry | 411/984 X |
| 3,493,026 | 2/1970 | Donofrio et al. | 411/120 |
| 3,875,985 | 4/1975 | Okuda | 411/120 |
| 4,734,001 | 3/1988 | Bennett | 411/119 |

FOREIGN PATENT DOCUMENTS 468629 7/1937 United Kingdom ................ 411/124

Primary Examiner—Rodney M. Lindsey
Attorney, Agent, or Firm—Flehr, Hohback, Test, Albritton & Herbert

[57] ABSTRACT

Locking fastener comprising a threaded part such as a bolt or nut and a lock plate which fits over the bolt or nut and is prevented from rotation by engagement with a stationary object such as a protrusion on the part to be secured. The lock plate has an opening with a contour which mates with the outer contour of the threaded part to prevent rotation of the threaded part, and the plate is retained on the threaded part by a retainer received in a detent opening or groove formed in the threaded part. In some embodiments, the retainer is a separate part which is free to rotate in the groove. In other embodiments, the retainer comprises a detent lug carried by the lock plate.

16 Claims, 2 Drawing Sheets

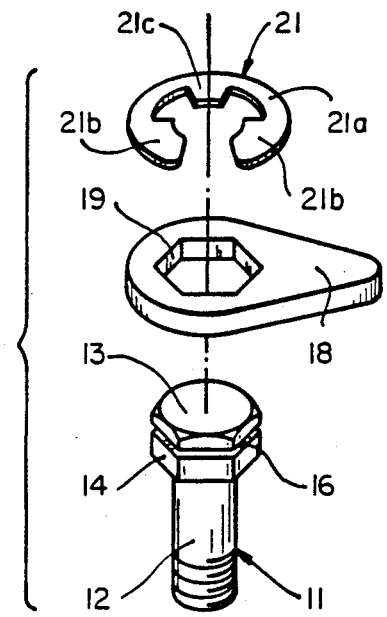
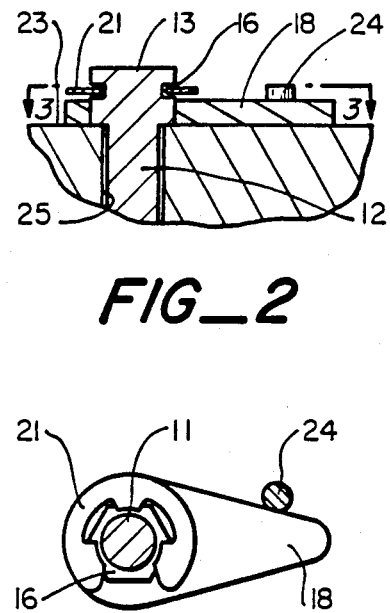
FIG_1  FIG_2  FIG_3
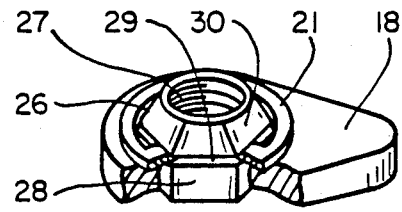
FIG_4
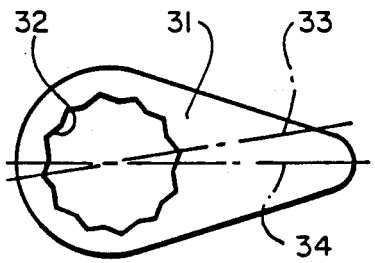 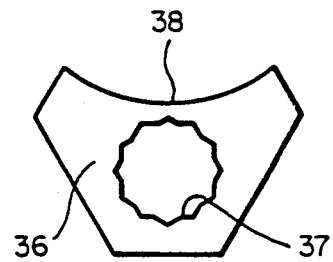
FIG_5  FIG_6

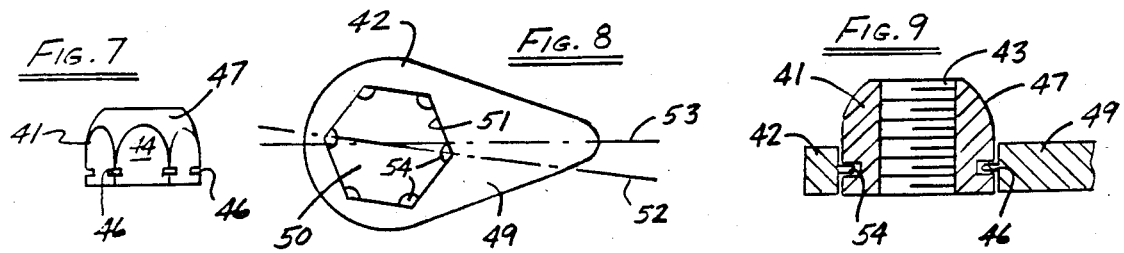
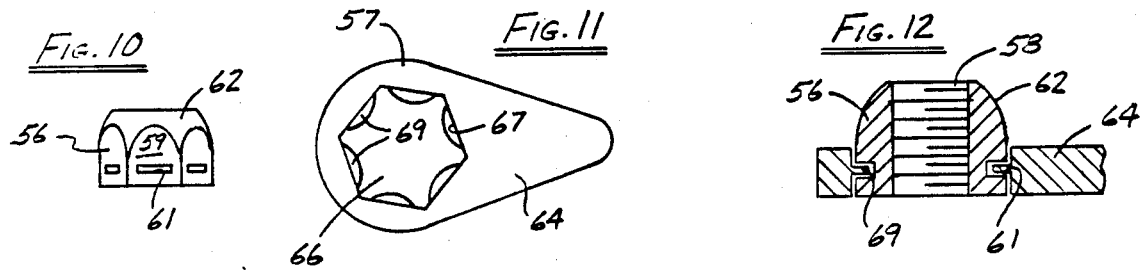
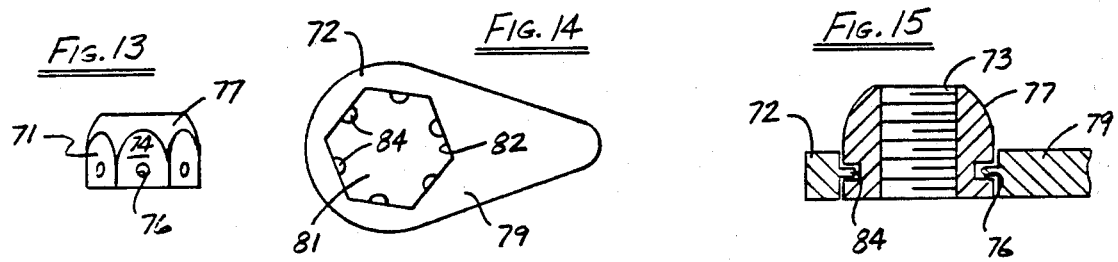
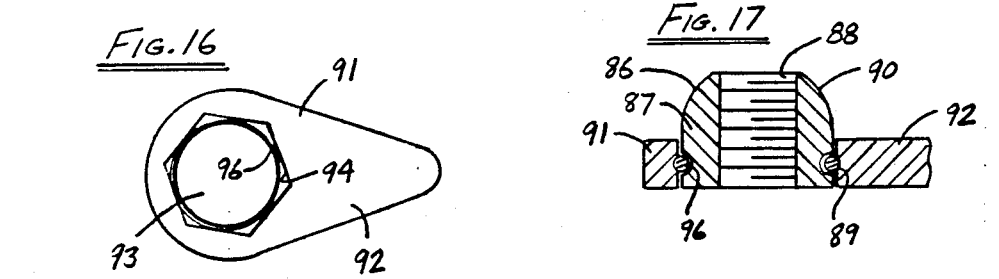
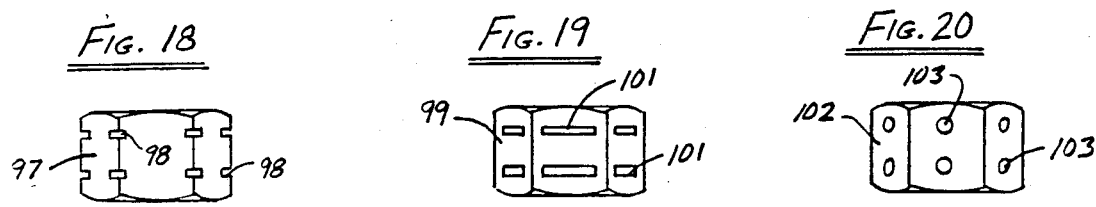

LOCKING FASTENER

This is a continuation-in-part of Ser. No. 888,011, filed July 18, 1986, now U.S. Pat. No. 4,734,001 which is a continuation-in-part of Ser. No. 755,907, filed July 17, 1985, now abandoned.

This invention pertains generally to threaded fasteners such as bolts and nuts, and more particularly to a fastener which is secured against movement from a set position.

Heretofore, a number of techniques have been employed to secure bolts and nuts and prevent them from working loose when subjected to vibration. Such techniques have included the use of lock washers, locking fluids, various mechanical restraints, and even welding the fasteners in place. All of these techniques have certain limitations and disadvantages. Some are too complicated for practical use, some are ineffective, and some can be employed only in certain specific applications. With many of these techniques, it is not possible to remove the fastener once it has been secured without destroying either the locking device or the fastener itself.

It is in general an object of the invention to provide a new and improved fastener which is secured against movement from a set position.

Another object of the invention is to provide a fastener of the above character which overcomes the limitations and disadvantages of locking fasteners heretofore provided.

Another object of the invention is to provide a fastener of the above character which is easily installed and removed, reliable and suitable for use in a wide variety of applications.

These and other objects are achieved in accordance with the invention by providing a threaded fastener such as a bolt or nut with a lock plate which fits over the fastener and is prevented from rotation by engagement with a stationary object such as a protrusion on the part to be secured. The plate has an opening with a contour which mates with the outer contour of the fastener to prevent rotation of the fastener, and the plate is retained on the fastener by a retainer received in a groove or detent opening formed in the fastener itself. In some embodiments, the retainer is a separate element which is free to rotate in the groove. In other embodiments, the retainer comprises a detent lug carried by the lock plate.

FIG. 1 is an exploded isometric view of one embodiment of a locking fastener according to the invention.

FIG. 2 is a cross-sectional view of the fastener of FIG. 1 in its assembled and operative position.

FIG. 3 is a cross-sectional view taken along line 3—3 in FIG. 2.

FIG. 4 is an isometric view, partly broken away, of a second embodiment of a locking fastener according to the invention.

FIGS. 5 and 6 are top plan views of additional embodiments of locking plates for use in the fastener of the invention.

FIG. 7 is a side elevational view of another embodiment of a threaded fastener for use in the locking fastener of the invention.

FIG. 8 is a top plan view of a locking plate for use with the threaded fastener of FIG. 7.

FIG. 9 is a fragmentary cross-sectional view of the locking plate of FIG. 8 installed on the threaded fastener of FIG. 7.

FIG. 10 is a side elevational view of another embodiment of a threaded fastener for use in the locking fastener of to the invention.

FIG. 11 is a top plan view of a locking plate for use with the threaded fastener of FIG. 10.

FIG. 12 is a fragmentary cross-sectional view of the locking plate of FIG. 11 installed on the threaded fastener of FIG. 10.

FIG. 13 is a side elevational view of another embodiment of a threaded fastener for use in the locking fastener of to the invention.

FIG. 14 is a top plan view of a locking plate for use with the threaded fastener of FIG. 13.

FIG. 15 is a fragmentary cross-sectional view of the locking plate of FIG. 14 installed on the threaded fastener of FIG. 13.

FIG. 16 is a top plan view of another embodiment of a locking plate for use in the locking fastener of the threaded fastener of the invention.

FIG. 17 is a fragmentary cross-sectional view of the locking plate of FIG. 16 installed on a threaded fastener in accordance with the invention.

FIGS. 18–20 are side elevational views of additional embodiments of threaded fasteners for use in locking fasteners incorporating the invention.

As illustrated in FIG. 1, the locking fastener comprises a threaded fastener or part in the form of a bolt 11 which has a threaded shank portion 12 and a hexagonal head portion 13. The head portion has a non-circular contour in plan view, with flat surfaces 14 arranged in opposing pairs for engagement by a wrench. A peripheral groove 16 is formed in the head portion toward the outer end of the head portion and opens through the flat surfaces.

A lock plate 18 with a hexagonal opening 19 fits over the head portion of the bolt, with the head portion extending through the hexagonal opening. The size and shape of the opening are such that the head portion of the bolt can pass freely through the opening in an axial direction, but it cannot rotate within the opening. The plate has a generally teardrop shape and is adapted to abut against a stationary object such as a protrusion on the part to be held, thus preventing the bolt from rotating in the direction which would cause it to loosen.

The lock plate is retained axially on the bolt by an E-shaped retainer clip 21 mounted in groove 16. This clip, commonly known as an E-clip, has a generally C-shaped resilient body 21a, with ears 21b, 21c projecting inwardly from the end and central portions of the C-shaped body. The body has an outer diameter greater than the opening in lock plate 18, and the inwardly projecting ears are received in the groove 16 in the bolt head. The opening between the confronting ends of clip 21 is smaller than the diameter of groove 16, and the clip is mounted in the groove with a snapping action.

The inner wall of groove 16 is circular, and it is of slightly smaller diameter than E-clip 21 so that the E-clip is free to rotate on the bolt head. This isolates the E-clip from the direct effects of vibration, heating and cooling, and serves to prevent stress failures due to these factors.

In FIG. 2, the fastener is illustrated in connection with a workpiece 23 which has a protrusion 24 projecting therefrom. The bolt is inserted into a hole 25 in the workpiece and tightened in the conventional manner with a wrench which engages the head portion of the bolt. Thereafter, locking plate 18 is placed over the head portion of the bolt and positioned to abut against protrusion 24 in the event that the bolt should begin to loosen. Retainer clip 21 is inserted in groove 16, and the locking plate is thus retained between the workpiece and the retainer clip.

The thickness of lock plate 18 is less than the distance between groove 16 and the shoulder at the bottom of the bolt head so that it will not interfere with the rotation of the retainer clip in the groove. As noted above, this rotation is important in preventing stress failures due to vibration or changes in size or shape due to heating or cooling.

The embodiment of FIG. 4 is similar to the embodiment of FIG. 1, and like reference designate corresponding elements in the two embodiments. In the embodiment of FIG. 4, however, the fastener is a nut 26 having a hexagonal body with an internal thread 27 and external flat surfaces 28 arranged in opposite pairs for engagement with a wrench. Retainer clip 21 is mounted in a groove 29 which opens through surfaces 28 toward one end of the nut. Lock plate 18 fits over the nut and prevents rotation of the nut in the same manner that it prevents rotation of the bolt in the embodiment of FIG. 1. As in the embodiment of FIG. 1, the retainer clip is free to rotate in the groove.

The outer end surface 30 of the nut adjacent to groove 29 is bevelled or tapered to facilitate installation of the retainer clip. When pressed onto the nut over this surface, the clip opens and snaps into groove 29. This enables the retainer to be installed in an axial direction and permits the device to be employed in places where there is little or no access to the sides of the fastener. The head of a bolt or other fastener can be bevelled or tapered in a similar manner.

The lock plate 31 illustrated in FIG. 5 is similar to lock plate 18 except it has a 12-point opening 32 instead of a hexagonal opening. The opening is oriented to provide an offset of 7.5 degrees between its axis of symmetry 33 and the centerline 34 of the plate. The plate can be positioned with either side up, and with the offset it can be oriented in any one of 24 different positions about the bolt or nut. The hexagonal opening 19 in plate 18 can be offset in a similar manner to provide 6 additional positions when that plate is turned over.

The lock plate can be of any suitable size and shape for a particular application, and FIG. 6 illustrates an embodiment which is particularly suitable for securing the nuts or bolts which hold an exhaust header on an engine. This plate, designated by the reference numeral 36, has a 12-point opening 37 and an arcuate side edge 38 which mates with the header pipe to prevent the plate from turning.

In the embodiments illustrated in FIGS. 7-20, the retainer which holds the lock plate on the threaded fastener is carried by the lock plate, rather than being a separate element as in the previous embodiments. Although these embodiments are illustrated with specific reference to nuts, they are equally applicable to bolts and other types of threaded fasteners.

The fastener illustrated in FIGS. 7-9 comprises a nut 41 and a lock plate 42. The nut has a hexagonal body with an internal thread 43 and a plurality of flat faces 44 arranged in opposite pairs for engagement with a wrench. The nut has a plurality of detent openings in the form of notches 46 across the corners between the flat surfaces. The detent openings are equally spaced from the lower end of the nut, and the upper portion of the nut is formed with a crown 47 to facilitate installation of the lock plate. In the embodiment illustrated, the crown is rounded, but it could also be bevelled or tapered, if desired.

Lock plate 42 has a teardrop-shaped body 49 with a hexagonal opening 50 having flat faces 51 for engagement with the flat faces of the nut. The hexagonal opening is oriented asymmetrically of the lock plate, with an angle on the order of 15 degrees between the axis of symmetry 52 of the opening and the centerline 53 of the plate. The plate can be positioned on the nut with either side up, and the asymmetrical orientation of the opening permits the plate to be oriented in any one of twelve different positions about the nut.

Lock plate 42 also has detent lugs 54 which extend into the hexagonal opening at the corners between the flat faces and are received in detent openings 46 to retain the plate on the nut. As best seen in FIG. 9, the lugs are positioned on the vertical centerline of the plate, so the plate will be in the same axial position on the nut regardless of which side is turned up.

The fastener illustrated in FIGS. 10-12 comprises a nut 56 and a lock plate 57. The nut has a hexagonal body with an internal thread 58 and a plurality of flat faces 59 arranged in opposite pairs for engagement with a wrench. The nut has a plurality of detent openings in the form of slots or notches 61 in the flat surfaces. The detent openings are equally spaced from the lower end of the nut, and the upper portion of the nut is formed with a crown 62 to facilitate installation of the lock plate. In the embodiment illustrated, the crown is rounded, but it could also be bevelled or tapered, if desired.

Lock plate 57 has a teardrop-shaped body 64 with a hexagonal opening 66 having flat faces 67 for engagement with the flat faces of the nut. The hexagonal opening is oriented asymmetrically of the lock plate, with an angle on the order of 15 degrees between the axis of symmetry of the opening and the centerline of the plate. The plate can be positioned on the nut with either side up, and the asymmetrical orientation of the opening permits the plate to be oriented in any one of twelve different positions about the nut.

Lock plate 57 also has generally semicircular detent lugs 69 which extend into the hexagonal opening from the flat faces and are received in detent openings 61 to retain the plate on the nut. As best seen in FIG. 12, the lugs are positioned on the vertical centerline of the plate, so the plate will be in the same axial position on the nut regardless of which side is turned up.

The fastener illustrated in FIGS. 13-15 comprises a nut 71 and a lock plate 72. The nut has a hexagonal body with an internal thread 73 and a plurality of flat faces 74 arranged in opposite pairs for engagement with a wrench.

The nut has a plurality of detent openings in the form of circular dimples 76 in the flat surfaces. The detent openings are equally spaced from the lower end of the nut, and the upper portion of the nut is formed with a crown 77 to facilitate installation of the lock plate. In the embodiment illustrated, the crown is rounded, but it could also be bevelled or tapered, if desired.

Lock plate 72 has a teardrop-shaped body 79 with a hexagonal opening 81 having flat faces 82 for engagement with the flat faces of the nut. The hexagonal opening is oriented asymmetrically of the lock plate, with an angle on the order of 15 degrees between the axis of symmetry of the opening and the centerline of the plate. The plate can be positioned on the nut with either side up, and the asymmetrical orientation of the opening permits the plate to be oriented in any one of twelve different positions about the nut.

Lock plate 72 also has detent lugs 84 which extend into the hexagonal opening from the flat faces and are received in detent openings 76 to retain the plate on the nut. As best seen in FIG. 15, the lugs are positioned on the vertical centerline of the plate, so the plate will be in the same axial position on the nut regardless of which side is turned up.

Lock plates 42, 57 and 72 are each formed as a unitary structure of a relative rigid but somewhat resilient material, such as a hard nylon, with the detent lugs being formed as an integral part of the plate. In one presently preferred embodiment, the plate is fabricated of nylon 610 or 612 and formed by an injection molding process. The resiliency of the material permits the lugs to deflect and snap into the detent openings as the plate is installed on the nut, and the hardness of the material prevents it from deforming or wearing excessively in use.

In the embodiment of FIGS. 16 and 17, the nut 86 has a hexagonal 87 body with an internal thread 88 and a plurality of flat faces arranged in opposite pairs for engagement with a wrench. The nut has a plurality of detent openings in the form of semicircular notches 89 across the corners between the flat surfaces. The detent openings are equally spaced from the lower end of the nut, and the upper portion of the nut is formed with a crown 90 to facilitate installation of the lock plate. In the embodiment illustrated, the crown is rounded, but it could also be bevelled or tapered, if desired.

Lock plate 91 has a teardrop-shaped body 92 with a hexagonal opening 93 having flat faces 94 for engagement with the flat faces of the nut. The hexagonal opening is oriented asymmetrically of the lock plate, with an angle on the order of 15 degrees between the axis of symmetry of the opening and the centerline of the plate. The plate can be positioned on the nut with either side up, and the asymmetrical orientation of the opening permits the plate to be oriented in any one of twelve different positions about the nut.

Lock plate 91 also has a retaining ring 96 which extends into the hexagonal opening and is received in detent openings 89 to retain the plate on the nut. As best seen in FIG. 17, the retaining ring is positioned on the vertical centerline of the plate, so the plate will be in the same axial position on the nut regardless of which side is turned up.

Lock plate 91 is fabricated of a relatively rigid material such as hard nylon, and retaining ring is fabricated of a more resilient or compressible material which can deform and snap into the detent openings as the plate is installed on the nut. The ring is molded into the lock plate as the plate is formed.

In the embodiments of FIGS. 7-17, the fasteners are installed by installing the nut on a bolt or the like to secure two or more parts together. The lock plate is positioned for engagement with a stationary part to prevent further rotation of the nut, then pushed over the crowned surface onto the nut until the detent lugs or retaining ring snap into the detent openings. This process can be performed either manually or by automated equipment, such as a robot, in an automated assembly process.

As noted above, the lock plates of FIGS. 7-17 can also be employed with bolts or other fasteners instead of nuts. The head of the bolt is received in the hexagonal opening of the plate, and the detent openings are formed in the flat faces or across the corners of the head. The outer end of the bolt head can be formed with a crowned surface to facilitate installation of the lock plate.

The nuts illustrated in FIGS. 18-20 are similar to the nuts illustrated in FIGS. 7, 10 and 13 except that they have a second row of detent openings instead of a crowned surface toward one end of the nut. Thus, nut 97 has two rows of notches 98 at its corners, nut 99 has two rows of short slots or notches 101 in its flat faces, and nut 102 has two rows of dimpled openings 103 in its flat faces. These nuts are suitable for use with the lock plates of FIGS. 8, 11 and 14, respectively, and a similar nut having two rows of semicircular corner notches can also be provided for the lock plate of FIG. 16. With the nuts having two rows of detent openings, the lock plates can be positioned toward either end of the nuts.

While the invention has been described with specific reference to bolts and nuts, it can be employed with lag screws and other threaded fasteners as well. The lock plate can be secured against rotation by abutting engagement with any nearby stationary object such as a protrusion on the part being held, another bolt or nut, or a dowel pin. The plate can also be secured by bending a portion of it over to form a tab for engagement with a stationary surface. The non-circular contour of the threaded fastener can be any contour which will interlock with a mating contour in the locking plate to prevent relative rotation of the two parts, including straight knurling or a spline and groove. Likewise, the retainer clip can be any suitable type of spring clip.

The invention has a number of important features and advantages. It is easily installed and removed, and it can be employed in both large and small spaces. It can be tightened with any type of wrench employed with conventional nuts and bolts in a similar space. No special tools are required to install and remove the locking plate and retainer clip. The clip can be installed either from the end of the bolt or nut or from the side. The clip and plate can be removed and reinstalled repeatedly without damage to either these parts or to the fastener itself, and without any loss of security. The condition of the parts can be observed visually, and the presence of the lock plate and retainer clip can be checked from a distance, e.g. on an overhead sign, or on a moving object, e.g. a conveyor. The parts are easily removed and tested if desired. The clip is free to rotate on the bolt or nut, and this prevents stress failures in the clip due to vibration, heating or cooling. The device is economical to manufacture, and it can employ a standard clip such as a standard E-clip as the retaining clip. No lockwasher is required, and there is no marring of the surface by such a washer. The threads can be lubricated or coated with an anti-seizing compound to facilitate installation and removal of the fastener without danger of permitting the fastener to work loose, and the fastener can be accurately tightened to a desired torque. This lock will not damage the threads of the fastener as do other locking devices such as nuts which misfit slightly or are swaged onto the fastener.

It is apparent from the foregoing that a new and improved locking fastener has been provided. While only certain presently preferred embodiments have been described in detail, as will be apparent to those familiar with the art, certain changes and modifications can be made without departing from the scope of the invention as defined by the following claims.

I claim:

1. A locking fastener, comprising a threaded part having an external surface of non-circular contour, a lock plate having an opening in which the surface of non-circular contour is received to prevent rotation of the threaded part, a detent opening formed in a fixed position relative to the external surface of the threaded part, and a detent lug carried by the lock plate and extending into the detent opening to retain the lock plate on the threaded part, said lock plate being fabricated of a material such that it is rigid enough to prevent rotation of the threaded part and resilient enough to permit the lug to deflect and snap into the detent opening.

2. The locking fastener of claim 1 wherein the threaded part is a bolt.

3. The locking fastener of claim 1 wherein the threaded part is a nut.

4. The locking fastener of claim 1 wherein the threaded part has a crowned surface adjacent to the surface of non-circular contour for engagement with the detent lug to guide the lug onto the surface of non-circular contour for snapping engagement with the detent opening as the lock plate is pushed onto the threaded part.

5. The locking fastener of claim 1 wherein the surface of non-circular contour comprises a plurality of planar faces, a detent opening is formed in each of the planar faces, and the lock plate has detent lugs extending into each of the detent openings.

6. The locking fastener of claim 1 wherein the surface of non-circular contour comprises a plurality of planar faces with corners between the adjacent ones of the faces, a detent opening is formed in each of the corners, and the lock plate has detent lugs extending into each of the detent openings.

7. The locking fastener of claim 1 wherein the opening in the lock plate is oriented in an asymmetrical manner relative to the plate, and the plate can be moved to a different position about the threaded part by turning it over on the threaded part.

8. A locking fastener, comprising a bolt having a head with a hexagonal peripheral surface, a lock plate having an opening in which the hexagonal surface is received to prevent rotation of the bolt, a detent opening formed in a fixed position relative to the hexagonal surface, and a detent lug carried by the lock plate and extending into the detent opening to retain the lock plate on the bolt, said lock plate being fabricated of a material such that it is rigid enough to prevent rotation of the bolt and resilient enough to permit the lug to deflect and snap into the detent opening.

9. The locking fastener of claim 8 wherein the hexagonal surface has a plurality of flat faces, and the detent opening is formed in at least one of the flat faces.

10. The locking fastener of claim 8 wherein the hexagonal surface has a plurality of flat faces with corners between adjacent ones of the flat faces, and the detent opening is formed in at least one of the corners.

11. The locking fastener of claim 8 wherein the opening in the lock plate is oriented in an asymmetrical manner relative to the plate, and the plate can be moved to a different position about the bolt by turning it over on the bolt.

12. A locking fastener, comprising a nut having a hexagonal peripheral surface, a lock plate having an opening in which the hexagonal surface is received to prevent rotation of the nut, a detent opening formed in a fixed position relative to the hexagonal surface, and a detent lug carried by the lock plate and extending into the detent opening to retain the lock plate on the nut, said lock plate being fabricated of a material such that it is rigid enough to prevent rotation of the nut and resilient enough to permit the lug to deflect and snap into the detent opening.

13. The locking fastener of claim 12 wherein the hexagonal surface has a plurality of flat faces, and the detent opening is formed in at least one of the flat faces.

14. The locking fastener of claim 12 wherein the hexagonal surface has a plurality of flat faces with corners being adjacent ones of the flat faces, and the detent opening is formed in at least one of the corners.

15. The locking fastener of claim 12 wherein the opening in the lock plate is oriented in an asymmetrical manner relative to the plate, and the plate can be moved to a different position about the nut by turning it over on the nut.

16. The locking fastener of claim 1 wherein the lock plate is fabricated of hard nylon.

* * * * *